UNITED STATES PATENT OFFICE.

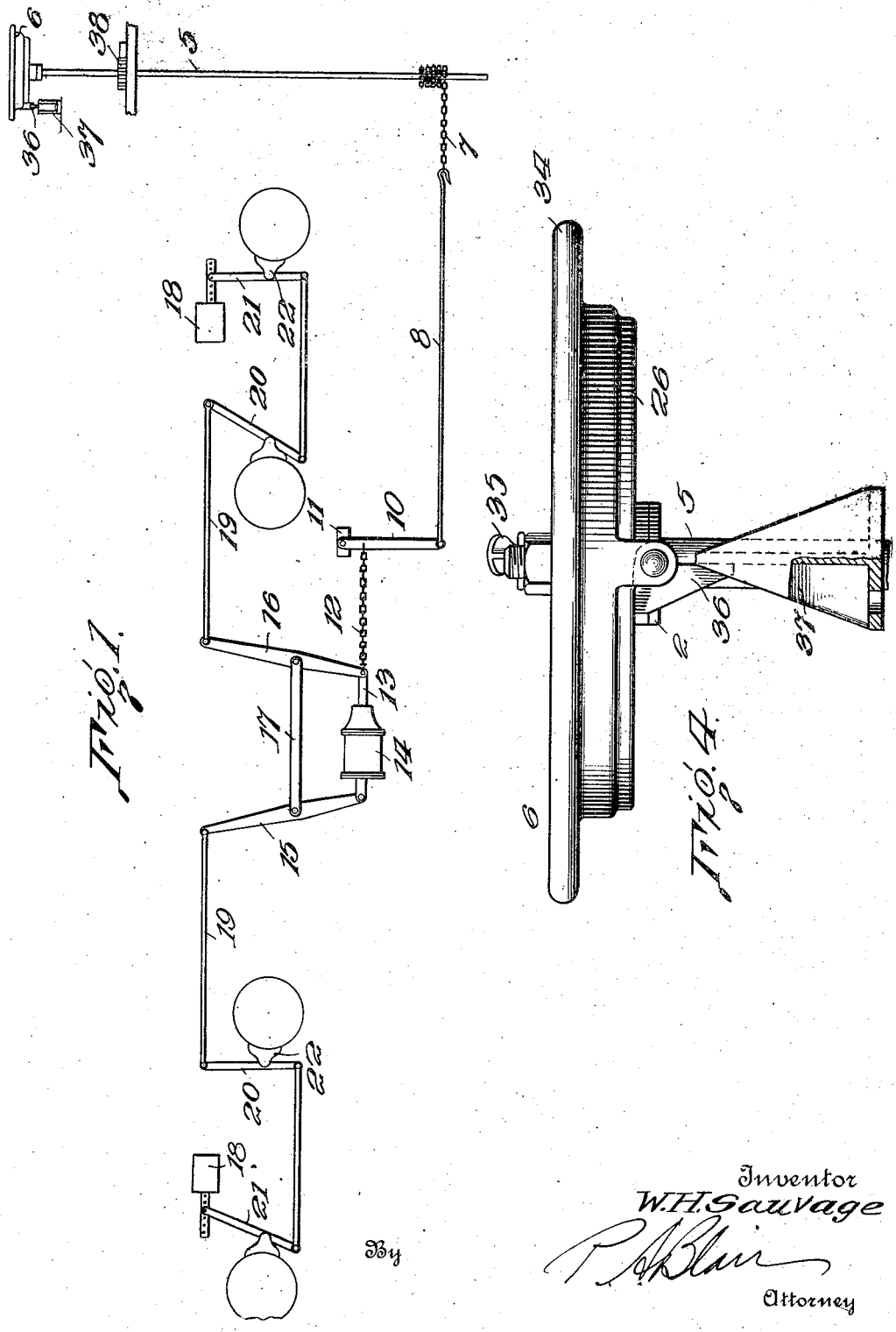

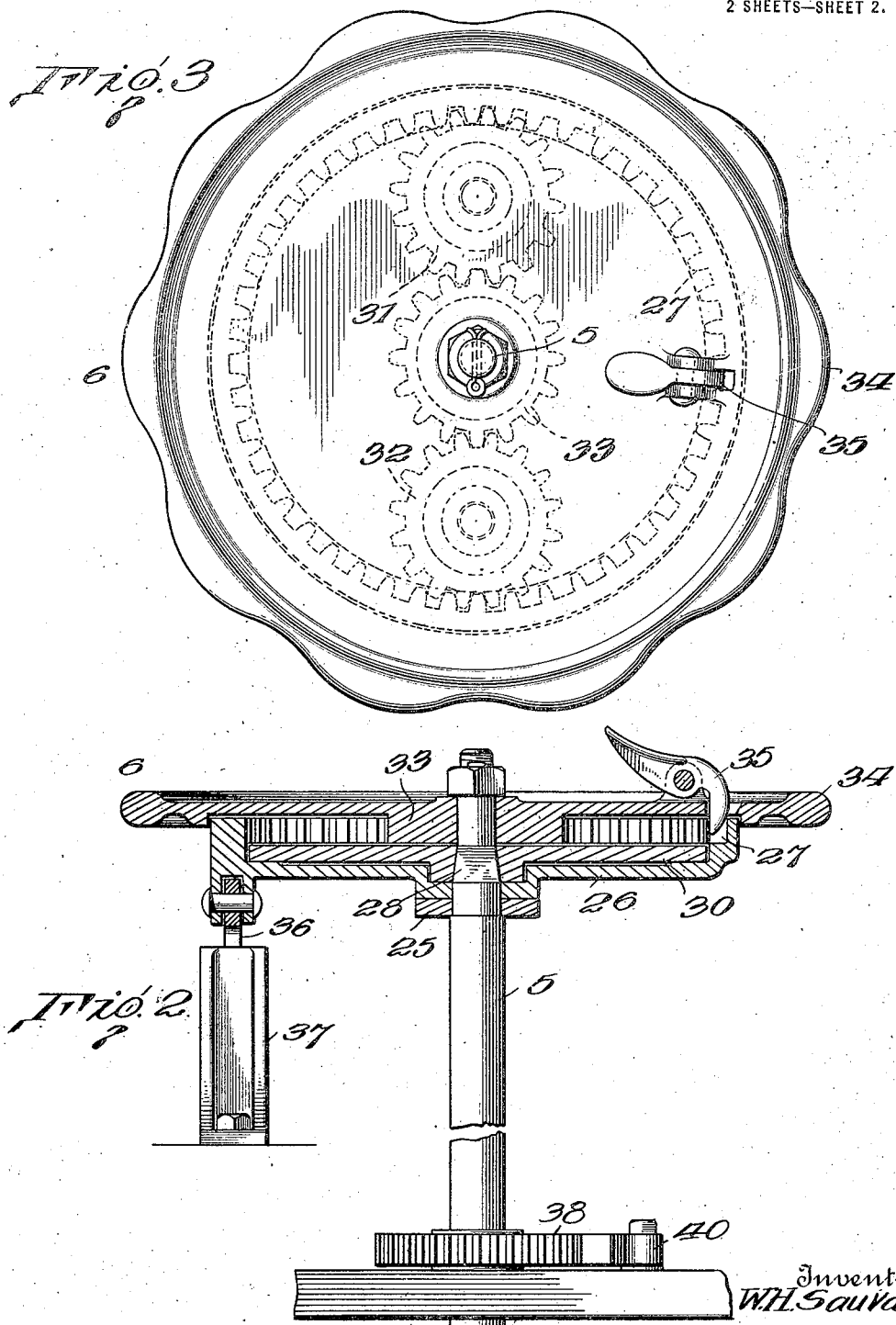

WILLIAM H. SAUVAGE, OF FLUSHING, NEW YORK.

BRAKE MECHANISM.

1,342,599.     Specification of Letters Patent.     Patented June 8, 1920.

Application filed October 23, 1917. Serial No. 198,089.

*To all whom it may concern:*

Be it known that I, WILLIAM H. SAUVAGE, a citizen of the United States, residing at Flushing, in the county of Queens and State of New York, have invented certain new and useful Improvements in Brake Mechanism, of which the following is a specification.

This invention relates to brake mechanism and more particularly to hand brake mechanism particularly adapted for use on freight cars, although it is of course applicable to other forms of cars and vehicles.

One of the objects of the present invention is to provide a simple and practical hand brake for cars which will be quick-acting and of a high power. A further object is to provide a hand brake mechanism for obtaining the maximum efficiency from the power applied. A further object is to provide a hand brake mechanism which may be easily and quickly applied to the braking mechanism of systems now employed on freight cars without material alterations and at a minimum of expense. A further object is to provide a hand brake having relatively few parts which will not be likely to get out of order and which may be made easily, quickly and cheaply.

Other objects will be in part obvious from the annexed drawings and in part indicated in connection therewith by the following analysis of this invention.

This invention accordingly consists in the features of construction, combination of parts and in the unique relations of the members and in the relative proportioning and disposition thereof, all as more completely outlined herein.

To enable others skilled in the art so fully to comprehend the underlying features thereof that they may embody the same by the numerous modifications in structure and relation contemplated by this invention, drawings depicting a preferred form have been annexed as a part of this disclosure, and in such drawings, like characters of reference denote corresponding parts throughout all the views, in which—

Figure 1 is a diagrammatic view showing the entire brake mechanism;

Fig. 2 is a vertical sectional elevational view of the hand brake;

Fig. 3 is a plan view of the hand brake with certain parts shown in dotted lines.

Fig. 4 is a side elevation at right angles to Fig. 2.

Referring now to the drawings in detail and more particularly to Fig. 1, 5 denotes a hand brake staff positioned at one end of a freight car, provided with a hand wheel 6 and connected at its lower end with a chain 7. This chain is secured to one end of the pull rod 8, the opposite end of which co-acts with a relatively short lever 10 pivoted to a fixed support 11 on the under side of the car body. A flexible connection 12, such as a chain, extends between this lever 10 and the outer end 13 of the piston of the air brake power cylinder 14, whereby the power cylinder or air brake system may operate without affecting the hand brake mechanism. This cylinder 14 is connected at its rear end with a lever 15 and the end of the piston is connected by means of levers 16 which are spaced apart by means of a link 17.

The opposite ends of the levers 15 and 16 are connected by pull rods 19 to the truck braking mechanism, which is indicated by a bolster 18 and live and dead levers 20 and 21 respectively. These levers are provided with brake shoes 22 adapted to co-act with the adjacent surfaces of the wheels of the truck in the usual manner. It is to be noted that these levers are so positioned, arranged and proportioned substantially as indicated, whereby a pull of indicated dimensions upon the pull rod 8 will transmit high power to the live and dead levers of the truck brake rigging. This indicated pull is obtained by means of the hand brake mechanism shown in detail in Figs. 2 and 3. The brake staff 5 is provided with a shoulder at its upper end upon which rests a washer 25 supporting a concave plate 26 having an upturned flange provided with an inner orbital gear 27. Immediately above the shoulder upon which the washer 25 rests is a squared portion 28 upon which is mounted a disk 30 carrying two pinions 31 and 32 meshing with the rack 27 and also a central pinion or sun gear 33 integrally formed with a hand wheel 34. These gears have a planetary type of arrangement whereby as the hand wheel 34 is turned the power will be transmitted through the planetary gears 31 and 32 to the gear 27 in any desired ratio of speed. It is to be noted that the upper disk plate or hand wheel 34 is provided with a pawl 35 adjacent the periphery whereby it may be conveniently actuated by the thumb of the operator to release the same from engagement with the rack 27, thus un-coupling the disk wheel and member 26. The latter is also provided with a pivoted pawl or latch mechanism 36 adapted to co-act with a fixed stop 37 secured to a fixed part of the car. The brake staff is also provided with the usual ratchet 38 adapted to be engaged by a pawl 40 mounted upon a fixed part of the car for holding the brakes while the operator is taking a fresh grip upon the hand wheel.

This device is operated substantially as follows:

Assuming the brakes are to be applied by hand, the operator grasps the hand wheel 34 and turns the same rapidly in a clockwise direction Fig. 3, the pawl 36 passing over the fixed stop 37 at each turn. This enables the operator to easily and quickly take up the slack of the chain 7 upon the brake staff.

As soon however as the brakes are brought to a position of application, the operator depresses the latch or pawl 35 and uncouples the hand disk wheel 34 and disk 26, whereupon the planetary gearing comes into operation. As soon as the pawl 35 is released the pawl 36 will back up against the stop 37 and prevent further rotation thereof, and for all practical purposes the member 26 is stationary. As the wheel 34 is then further rotated, the planetary gears, acting between the central gear 33 and the peripheral gear 27, will cause the brake staff to rotate at a slower rate of speed but with greatly increased power. As herein shown, the gear 27 is provided with forty-eight teeth, while the central gear is provided with sixteen teeth, thus providing a ratio of 1 to 3. It is, however, of course to be understood that other ratios may be employed as desired. It is believed however that the ratio of 1 to 3 is the more practical.

It is thus seen that the present invention provides a simple, practical and highly efficient hand brake system, particularly adapted for use on freight cars which will be inexpensive to manufacture and apply to freight cars now in general use. The invention in short is simple and accomplishes among others all of the objects herein set forth.

I realize that considerable variation is possible in the details of construction and arrangement of parts without departing from the spirit of my invention, and I therefore do not intend to limit myself to the specific form shown and described.

I claim:

1. In a hand brake mechanism, in combination, a brake staff having a pawl and ratchet holding mechanism, a hand wheel mounted on said staff provided with a central gear, a disk fixed upon said staff carrying planetary gears, a plate having an orbital gear with which said planetary gears are adapted to mesh, a stop adapted to co-act therewith, and means for locking the hand wheel and orbital gear together.

2. In a hand brake mechanism, in combination, a brake staff having a pawl and ratchet holding mechanism, a hand wheel mounted at the upper end of said staff provided with a central gear, a disk fixed upon said staff carrying planetary gears, and a plate having an orbital gear with which said planetary gears are adapted to mesh, means for locking the hand wheel and orbital gear together, and means for holding said orbital gear in fixed position when said hand wheel and orbital gear are disconnected.

3. In a hand brake mechanism, in combination, a brake staff, a hand wheel loosely mounted thereon having a central gear, a plate fixed to said staff having planetary gears, an orbital gear with which said planetary gears are adapted to mesh, means for connecting and disconnecting the hand wheel, and orbital gear at will, and locking mechanism for the orbital gear adapted to prevent excessive reverse rotation thereof when the same is disconnected with said hand wheel.

4. In a hand brake mechanism, in combination, a brake staff having pawl and ratchet holding mechanism, a plate loosely mounted upon said staff having a holding mechanism adapted to prevent reverse rotation, a disk supported by said plate carrying planetary gears, a power wheel loosely mounted upon said staff, having a sun gear and latch mechanism for connecting and disconnecting the sun gear and the orbital gear at will.

In testimony whereof I affix my signature in the presence of two witnesses.

WILLIAM H. SAUVAGE.

Witnesses:
BENJAMIN R. HESS,
FRANK YAHLE.